United States Patent [19]
Warren

[11] 4,322,125
[45] Mar. 30, 1982

[54] INFRA-RED FILTER

[75] Inventor: Stanley W. Warren, Old Harlow, England

[73] Assignee: International Standard Electric Corporation, New York, N.Y.

[21] Appl. No.: 66,198

[22] Filed: Aug. 13, 1979

[30] Foreign Application Priority Data

May 11, 1978 [GB] United Kingdom ............... 19029/78

[51] Int. Cl.³ .............................................. G02B 5/28
[52] U.S. Cl. ..................... 350/1.6; 350/164; 350/311
[58] Field of Search ............... 350/1.1, 1.6, 1.7, 164, 350/165, 166, 311; 427/162, 163

[56] References Cited

U.S. PATENT DOCUMENTS

| | | | |
|---|---|---|---|
| 3,758,193 | 9/1973 | Tung | 350/1.6 X |
| 4,004,851 | 1/1977 | Negishi et al. | 350/311 |
| 4,114,978 | 9/1978 | Bostick et al. | 350/1.7 |
| 4,114,983 | 9/1978 | Maffitt et al. | 350/164 |
| 4,190,321 | 2/1980 | Dorer et al. | 350/165 |

OTHER PUBLICATIONS

Thornton, "Limit Of The Moth's Eye Principle And...", J.O.S.A., vol. 65, No. 3, Mar. 1975, pp. 267-270.
Lussier, "Guide To IR-Transmissive Materials", Laser Focus, vol. 12, No. 12, Dec. 1976, pp. 47-50.

Primary Examiner—John D. Lee
Attorney, Agent, or Firm—John T. O'Halloran; Peter C. Van Der Sluys

[57] ABSTRACT

An infra-red filter substrate surface is profiled to form an undulating pattern whose dimensions correspond to the operating wavelength. This prevents spurious reflections when the filter is subsequently provided with a protective coating.

1 Claim, 6 Drawing Figures

INFRA-RED FILTER

BACKGROUND OF THE INVENTION

This invention relates to infra-red transmitting materials, and in particular to the provision of surface coatings on such materials.

In many applications it is necessary that infra-red transmitting materials should be able to withstand somewhat rough treatment. Preferably such materials should be at least as wear resistant as visible light transmitting materials in this respect. For example, windscreen wiping to remove water is more necessary in the infra-red than the visible region of the spectrum as water is opaque over most of the infra-red region. Unfortunately many of the infra-red materials presently in use do not approach the hardness of glass. Those materials that are sufficiently hard, e.g. silicon, have relatively high refractive indices. Such a high refractive index results in spurious surface reflection which can be reduced only by the application of an antireflection film to the surface of the material. Such films, however are relatively soft and, as they are extremely thin, e.g. 1 micron, any wear soon results in the removal of the film. Even a diamond film of a micron thickness would not survive for any length of time.

To provide camouflage the eyes of moths have anti-reflecting surfaces; presumably a black cavity is less conspicuous than a reflecting surface. The anti-reflection surface evolved by the moth consists of myriads of pimples approximately half a wavelength of light deep spaced apart by less than the wavelength of light. The pimple arrangement, which does not have to be precisely regular, provides a quite effective anti-reflection coating.

SUMMARY OF THE INVENTION

According to one aspect of this invention there is provided an infra-red transmitting element, including a transparent substrate on at least one surface of which a coating is provided, in which the coating includes particles of a hard transparent material, and in which the one surface of the substrate and/or both or more surfaces of the coating have undulating profile such that surface reflections are substantially eliminated.

According to another aspect of this invention there is provided a method of forming an infra-red transmitting element, including providing a transparent substrate with an undulating profiled surface, coating the surface with a paste comprising particles of a hard transparent material in a curable plastics resin, and curing the resin to form a hard non reflecting surface coating.

For best anti-reflection surfaces the pimple height should be greater than half the wavelength of the incident radiation. Since to avoid surface reflection the pimple spacing should be less than the shortest wavelength it is apparent that too great an emphasis on the optimum depth could lead to a spiny surface. Fortunately quite effective anti-reflection surfaces are obtained for a depth approximately a quarter of the longest wavelength. These pimples would be stubbier and hence stronger. The requirement for a spacing less than the wavelength of the incident light is easiest met in practice by an almost regular array. These arrays are usually on a hexagon or square format. Since in general the pimple spacings are much less than the wavelength of the incident light there is little tendency for the surface to diffract despite its regular array. It is thought that the pimple structure functions by providing a graded transition of refractive index between the air and the base material.

BRIEF DESCRIPTION OF THE DRAWINGS

Embodiments of this invention will now be described with reference to the accompanying drawings in which.

DETAILED DESCRIPTION OF THE PREFERRED EMBODIMENTS

Figure 1:
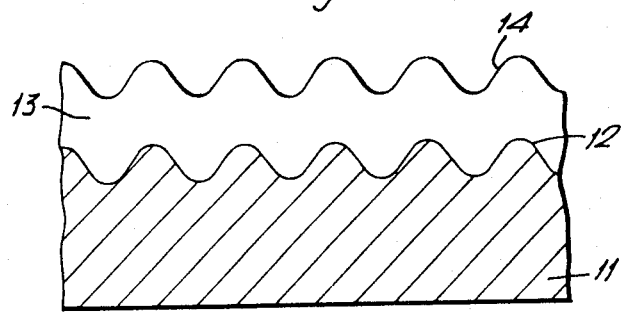
FIGS. 1 to 6 are schematic cross-sections of various forms of infra-red transmitting elements provided with anti-reflection coatings.

Referring to FIG. 1, there is shown a portion of an infra-red transmitting element formed from a germanium substrate 11 provided on one surface 12 with a 'diamond paste' anti-reflection coating 13 comprising a mixture of diamond dust and an infra-red transmitting plastic material. The surface 12 of the germanium substrate has a substantially sinusoidal profile in the manner of a moths eye to provide a key for the coating 13 and to reduce reflections occurring at the coating/germanium interface. Similarly the outer surface 14 of the diamond paste coating is substantially sinusoidally profiled to reduce reflections at the air interface. The thickness of the diamond layer is selected on the basis of the anticipated abrasion of its surface.

The moth's-eye patterns at the air/diamond and diamond/germanium surfaces are similar but do not necessarily correspond. The diamond is applied as a paste in a plastics resin which then hardens.

Figure 2:
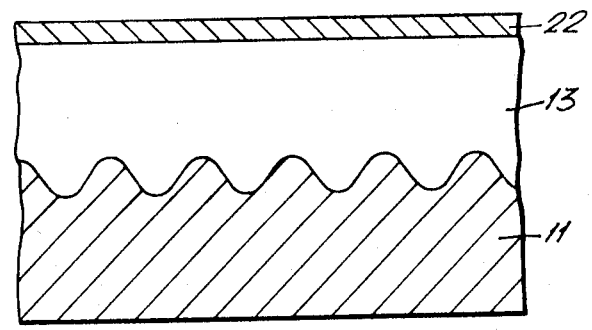

In the alternative arrangement of FIG. 2, the outer surface 21 of the diamond layer is plane and is coated with a conventional anti-reflection thin film coating 22.

Figure 3:
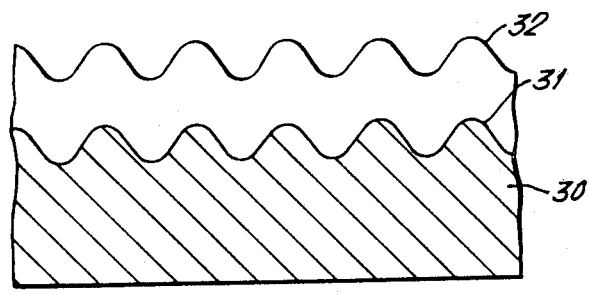

In FIG. 3, the arrangement of FIG. 1 is applied to a low refractive index, e.g. zinc Sulphide (ZnS), substrate 30. As before the substrate surface 31 and the diamond paste surface 32 are profiled with a moth's eye pattern, but in this case the irregular ZnS surface simply provides a key for the diamond paste coating. Clearly, the greater the difference between the refractive index of the substrate and the diamond paste the more important it is for the interface to approach the moth's eye profile to reduce reflections.

Figure 4:
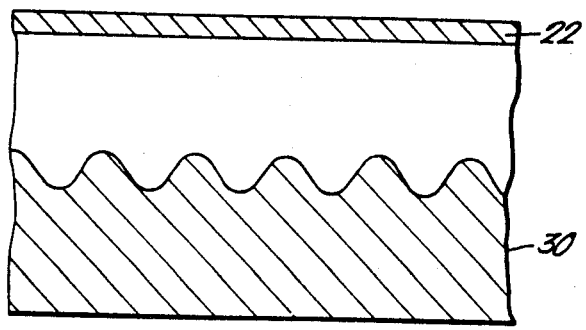

FIG. 4 shows a similar arrangement to that of FIG. 2 applied e.g. to a zinc sulphide substrate. As before the diamond paste coating 13 is provided with a hard anti-reflection coating 22. This arrangement is particularly advantageous where both visible and infra-red transmission are required.

Figure 5:
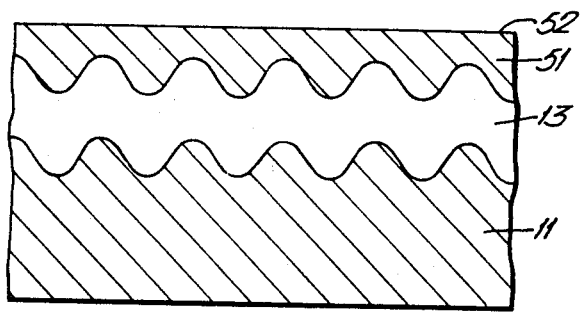

FIG. 5 shows the arrangement of FIG. 1 modified by the application of a surface infill coating 51 to the diamond paste coating 13 on a germanium substrate 11 thus providing a smooth external surface 52. The surface infill is a material of low refractive index, to reduce surface reflections, and is of course transparent in the infra-red region of the spectrum. The infill overcomes the problem of dust entrapment in the moth's eye pattern, and in some applications may provide a chemical resistant surface.

Figure 6:
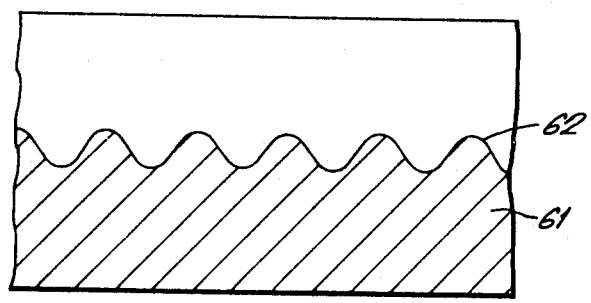

FIG. 6 shows an arrangement designed to protect an optical element 61 in a harsh chemical environment or a deliquescent material in a normal environment or designed to provide an element with different surface properties (anti-static, conducting, hydrophyllic, hydrophobic, low friction etc.) to that normally possessed. A material like polythene or ptfe could be used to protect the surface and a moth eye patterned surface 62 is provided at the substrate film interface to eliminate this reflection. A film of low index would not necessitate a moth eye treatment at the film air interface since the reflectance is already low; had the film index been high then the arrangement of FIG. 1 would have been adopted.

In the above description the term diamond paste has been used to indicate a hard surface. The composition can be varied according to application, wavelength, cost factors, etc. Thus, instead of diamond, other hard transparent materials e.g. fluorides, oxides, carbides, nitrides, may be used. The particles of these materials should be of the same size as the moth eye pattern dimensions or smaller.

The binder may be a dissolvable, thermosetting or thermoplastic material or the 'diamond' material may even be incorporated by growth or casting on the surface of the substrate. The binder is required to be infrared transmitting but not necessarily of the same index as the 'diamond' material. It may be chosen to have a lubricating property, e.g. p.t.f.e. or possibly polyethylene.

The moth's eye pattern may be formed by chemically etching the surface. This process could only be applied to a paste composition in which the particle size was small in comparison with the pattern dimensions. If the particle size corresponds to the pattern dimensions then the softer binder material may be selectively removed. If 'diamond' particles are embedded in the substrate surface by some process then again the surface profile may also be developed by some selective removal technique to expose the hard particle profile. As wear processes are better understood it may be possible to arrange that the paste continually restores its profile as components wear e.g. particles wear but the binder wears more rapidly until it is sufficiently depressed beneath the surface to wear at the rate necessary to maintain the profile; similarly if particles are dislodged then underlying particles would be re-established in the new surface in the correct pattern. The process would be similar to those occurring on reflecting white lines on road surfaces. Here glass beads of dimensions approximately one order greater than the wavelength of the light are embedded in a transparent plastic binder. During the process of 'painting' the line the glass beads become overlaid with the resin and the reflective properties are lost. This is restored by abrading the surface which removes the resin and exposes the glass beads. Vehicle movement over the surface cleans and restores the surface. The particular surface profile of the undulating surface is not critical provided that the pimple height is approximately half a wavelength and the pimple spacing is less than the wavelength at which the transmitting element operates.

What is claimed is:

1. An infra-red transmitting element, comprising a transparent substrate on at least one surface of which a coating is provided, in which the coating includes particles of a hard transparent diamond material and in which at least one of the surfaces of the coating have an undulating profile arrangement such that surface reflections are substantially eliminated.

* * * * *